United States Patent [19]
Jacobs et al.

[11] Patent Number: 5,557,972
[45] Date of Patent: Sep. 24, 1996

[54] MINIATURE SILICON BASED THERMAL VACUUM SENSOR AND METHOD OF MEASURING VACUUM PRESSURES

[75] Inventors: David C. Jacobs, Hampton; William J. Alvesteffer, Newport News, both of Va.

[73] Assignee: Teledyne Industries, Inc., Los Angeles, Calif.

[21] Appl. No.: 305,059

[22] Filed: Sep. 13, 1994

[51] Int. Cl.$^6$ ............................ G01L 7/00; G01L 21/12
[52] U.S. Cl. ........................................ 73/756; 73/755
[58] Field of Search ........................... 73/726, 727, 720, 73/721, 755, 756

[56] References Cited

U.S. PATENT DOCUMENTS

| | | | |
|---|---|---|---|
| 4,320,664 | 3/1982 | Rehn et al. | 73/708 |
| 4,729,242 | 3/1988 | Reich et al. | 73/755 |
| 4,902,138 | 2/1990 | Goeldner et al. | 374/44 |
| 5,108,193 | 4/1992 | Furubayashi | 374/164 |

OTHER PUBLICATIONS

Mannesmann Hartmann & Braun Prouct Information Sensor Technolgy "VPSO 28 Vacuum Prssure Sensor" Oct 1990.

Primary Examiner—Richard Chilcot
Assistant Examiner—Paul D. Amrozowicz
Attorney, Agent, or Firm—Calfee Halter & Griswold

[57] ABSTRACT

A miniaturized silicon based thermally controlled vacuum sensor uses thin film resistors on a membrane in a minute measuring chamber to accurately detect vacuum pressures in the range of 760 Torr to $1 \times 10^{-5}$ Torr. The configurations of the measuring chamber and gas diffusion port of the sensor structure insure that heat transfer from the membrane is predominately conductive over the pressure detection range to provide linear output up to 0.1 Torr. A microprocessor is used to control and measure power required to maintain a predetermined temperature differential between a sensing resistive element on the membrane and an ambient temperature sensing element of the sensor base from analog voltage and current values. Pressure detection errors introduced by ambient temperature variations are minimized by measuring power dissipated into the gas. Analog and digital converters for both current and voltage signals use a $\Sigma$–$\Delta$ conversion method to reject electrical noise by an averaging technique to produce stable signal detection of pressure down to $1 \times 10^{-5}$ Torr. The sensor is thermally stable over an ambient temperature range of 0°–50° C. at pressures between $10^{-4}$ to 760 Torr.

37 Claims, 3 Drawing Sheets

5,557,972

MINIATURE SILICON BASED THERMAL VACUUM SENSOR AND METHOD OF MEASURING VACUUM PRESSURES

FIELD OF THE INVENTION

The present invention relates generally to measurement of vacuum pressure and, in particular to an apparatus and method for measuring vacuum pressures.

BACKGROUND OF THE INVENTION

Thermal conductivity vacuum instruments are a class of pressure measurement devices that operate by measuring in some way the rate of heat transfer between a heated element and its surroundings. The heat transfer between a heated element and a nearby wall is pressure dependent when the Knudsen number (Kn) is in the range of 0.01<Kn<10. Examples of instruments of this type are the Pirani-type gauges such as the Granville-Phillips Convectron vacuum gauge that measures vacuum pressures by changes in the resistivity of a heated wire, and thermocouple-type gauges such as the Teledyne Brown Engineering-Hastings Instruments thermocouple-type vacuum gauge which measures pressures by monitoring changes in output voltage of a heated thermocouple.

All of these types of commercially available vacuum sensors exhibit one or more of the following problems: attitude sensitivity, highly nonlinear output signal, narrow dynamic range, fragility of the sensing element, bulky sensor and/or limited overpressure capability.

Another type of thermally controlled pressure sensor, formed of etched and vapor-deposited silicon has a heated thin-film resistor on a membrane, an ambient temperature sensing resistor on a silicon base substrate, and a lid over the membrane to form a measuring chamber. Such sensors can measure pressures in the range of 1000 Torr to $1\times10^{-5}$ Torr by maintaining the resistor on the membrane at a constant temperature so that the output of the thin-film resistor circuit changes with changing pressure. Dependent upon the dimensions of the chamber formed by the lid over the membrane, heat transfer from the heated resistor is generally by conduction from 0.001 Torr to 100 Torr, and by convection from 100 Torr to 760 Torr. One such sensor is the VPS028 offered by Mannesmann Hartmann & Braun Aktiengesellschaft, Frankfort, Germany. Such sensors have the advantages of small size and attitude insensitivity. However, pressure sensitivity in the range of 100 Torr to 760 Torr is low in sensors of this type which have a lid-to-membrane dimension on the order of a few hundred microns or greater. This is a result of the chamber operation in the transition or viscous flow regimes (depending on the pressure). Only in molecular flow is heat conduction directly proportional to pressure.

Another problem heretofore unsolved with respect to accurate measurement of pressure by miniaturized sensors is the difficulty of measuring small values of voltage or power against relatively large background power levels. For example, at $1\times10^{-5}$ Torr, the power signal level of the membrane resistor is five orders of magnitude less than the background power level. This would require seventeen bits of accurate resolution in an analog-to-digital converter to resolve the small signal. Measurements of power based only upon applied voltage lose the signal entirely in thermal noise generated by ambient temperature variations.

Other types of sensors use a constant voltage or constant current source to measure power by monitoring changes in resistance, and correcting for ambient temperature variations with non-linear compensator circuitry. However, the complexity of such compensation also interferes with accurate measurement at very low pressures. Electrical noise from parasitic capacitance of signal lines also interferes with accurate measurement of low level signals.

SUMMARY OF THE PRESENT INVENTION

The present invention provides a miniature silicon based vacuum pressure sensor which has excellent rapid response pressure sensitivity throughout a pressure range of 760 Torr to $1\times10^{-5}$ Torr.

In accordance with one aspect of the invention, a sensor is comprised of a silicon base having a cavity which extends from a bottom surface of the base to a top surface of the base, an opening in a side wall of the base to the cavity, a membrane on the top surface of the base dimensioned to cover the cavity, a single resistive element on the membrane, a second resistive element on the top surface of the base and not on the membrane, a cap having a top surface and a bottom surface, the bottom surface of the cap attached to the top surface of the base and spaced away from and covering the membrane, a controlled voltage source for applying voltages to the first and second resistive elements, and a measuring circuit for measuring power applied to the first and second resistive elements, the power required being a function of the pressure about the sensor.

In accordance with another aspect of the invention, a miniature pressure sensing device for sensing pressures in the approximate range of 760 Torr to $1\times10^{-5}$ Torr is provided. The sensing device is formed on a silicon chip approximately 2 mm square having a chamber formed through a cross-section of the chip, a membrane covering a top opening of the chamber, a single resistive element on the membrane cover over and spaced away from and parallel to the membrane and the single resistive element, and a second resistive element on the chip adjacent the membrane and cover. The chip is mounted upon an electrical feed-through header. A closed loop circuit controlled voltage source is connected to the first and second resistive elements in a voltage dividing bridge circuit wherein the first and second resistive elements are elements in a Wheatstone bridge circuit, wherein the closed loop circuit is operative to balance the bridge voltages. A microprocessor uses digitally converted analog voltage values to compute power values supplied to the bridge required to maintain a temperature differential between the surface upon which the first resistive element is mounted and the surface upon which the second resistive element is mounted.

In accordance with another aspect of the invention, a method for measuring vacuum pressures in the approximate range of, but not limited to, 760 Torr to $1\times10^{-5}$ is provided which includes the steps of applying a voltage to a first resistive element mounted on a membrane disposed in a gas chamber, applying the same voltage to a second resistive element mounted on a heat-absorbing substrate adjacent the membrane, controlling the applied voltages to maintain a temperature differential between the membrane and the substrate, measuring power levels required to maintain the temperature differential, and correlating measured power levels to pressure.

These and other aspects of the invention will be apparent to those skilled in the art upon reading and understanding the

DETAILED DESCRIPTION OF A PREFERRED EMBODIMENT

Figure 1:
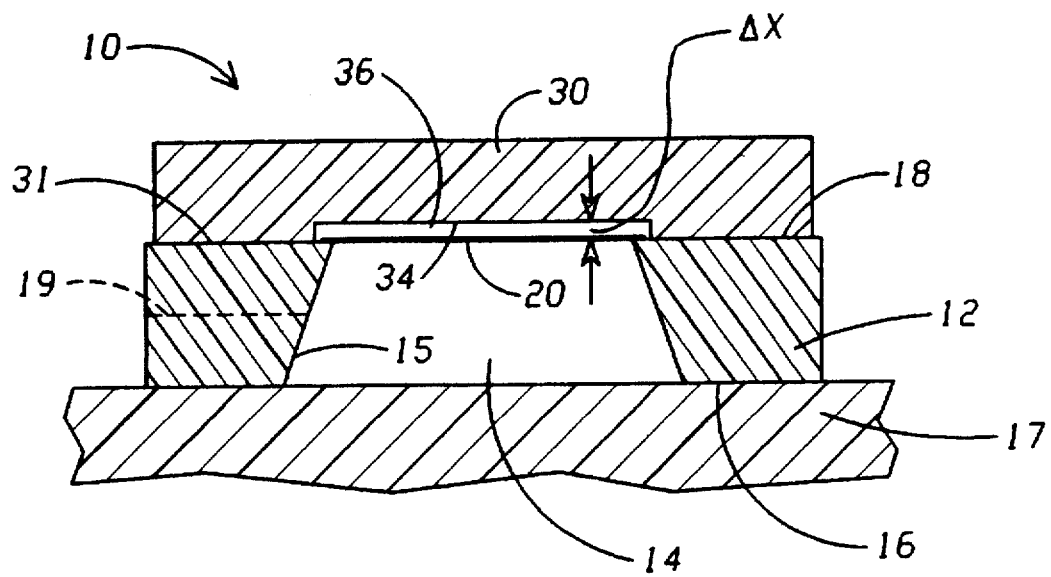
FIG. 1 is a cross-sectional view of the sensor structure of the present invention.
Figure 2:
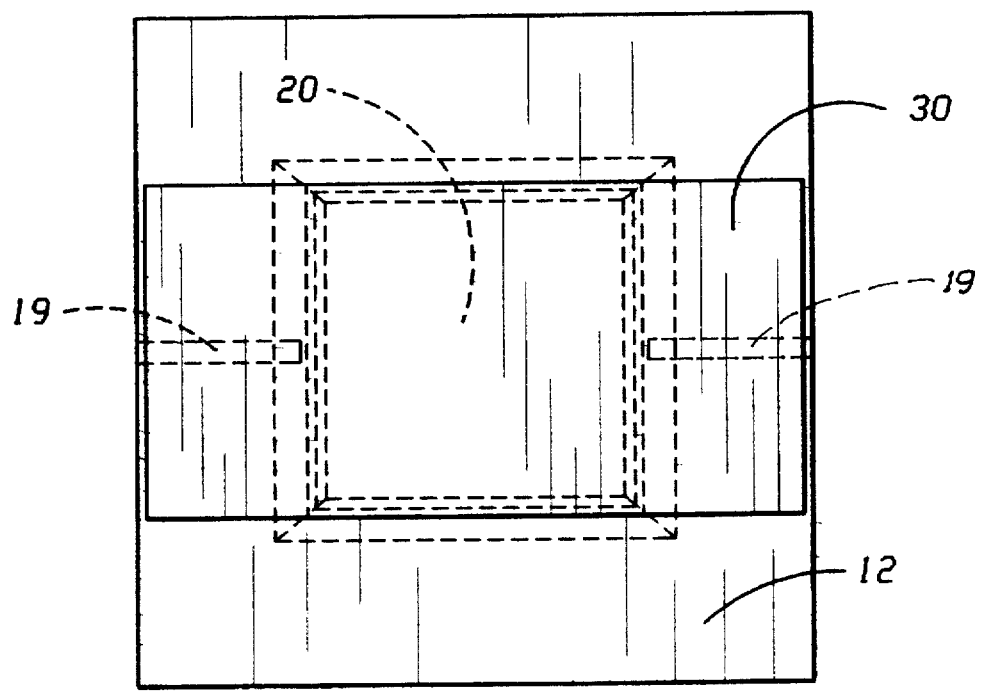
FIG. 2 is a plan view of the sensor structure of the present invention.
Figure 3:
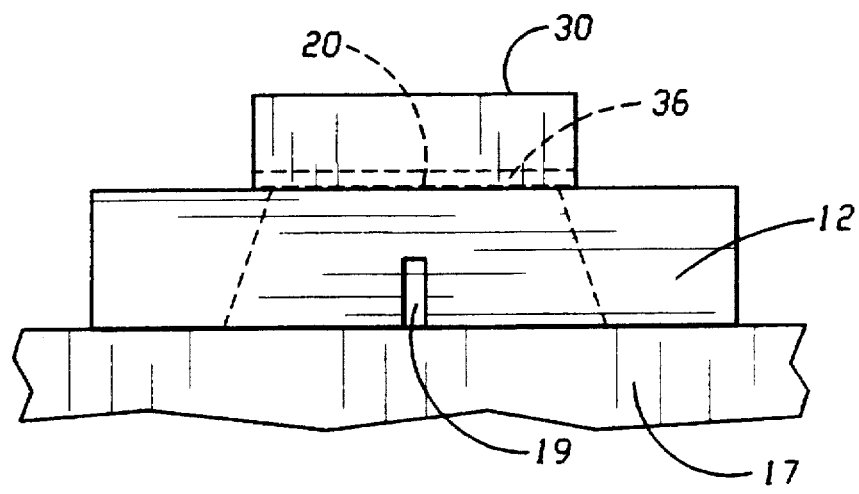
FIG. 3 is an end elevational view of the sensor structure of the present invention.

As illustrated in FIGS. 1–3, the structure of the sensor 10 includes a silicon substrate 12, such as a silicon chip approximately 2 mm square and approximately 400 microns thick, in which a chamber 14 is formed by, for example, chemical etching from a bottom surface 16 of the substrate to a top surface 18 of the substrate. The chamber 14 is approximately 1 mm square and located in the center of the substrate. Internal sidewalls 15 of the chamber may be angled from bottom surface 16 to top surface 18 of the substrate 12. Openings 19 through substrate 12 serve as gas vents from chamber 14. Additional such openings may be provided in the substrate. The chip may be constructed of alternate suitable materials such as, for example, galium arsenide or germanium.

A thin layer of silicon nitride is applied to a top surface 18 of substrate 12 over the area of chamber 14 to form a silicon-rich nitride membrane 20 having a thickness of approximately one micron. Substrate 12 is bonded at bottom surface 16 to an electrical header/feed-through 17 such as a T05 or T08 base.

Figure 4:
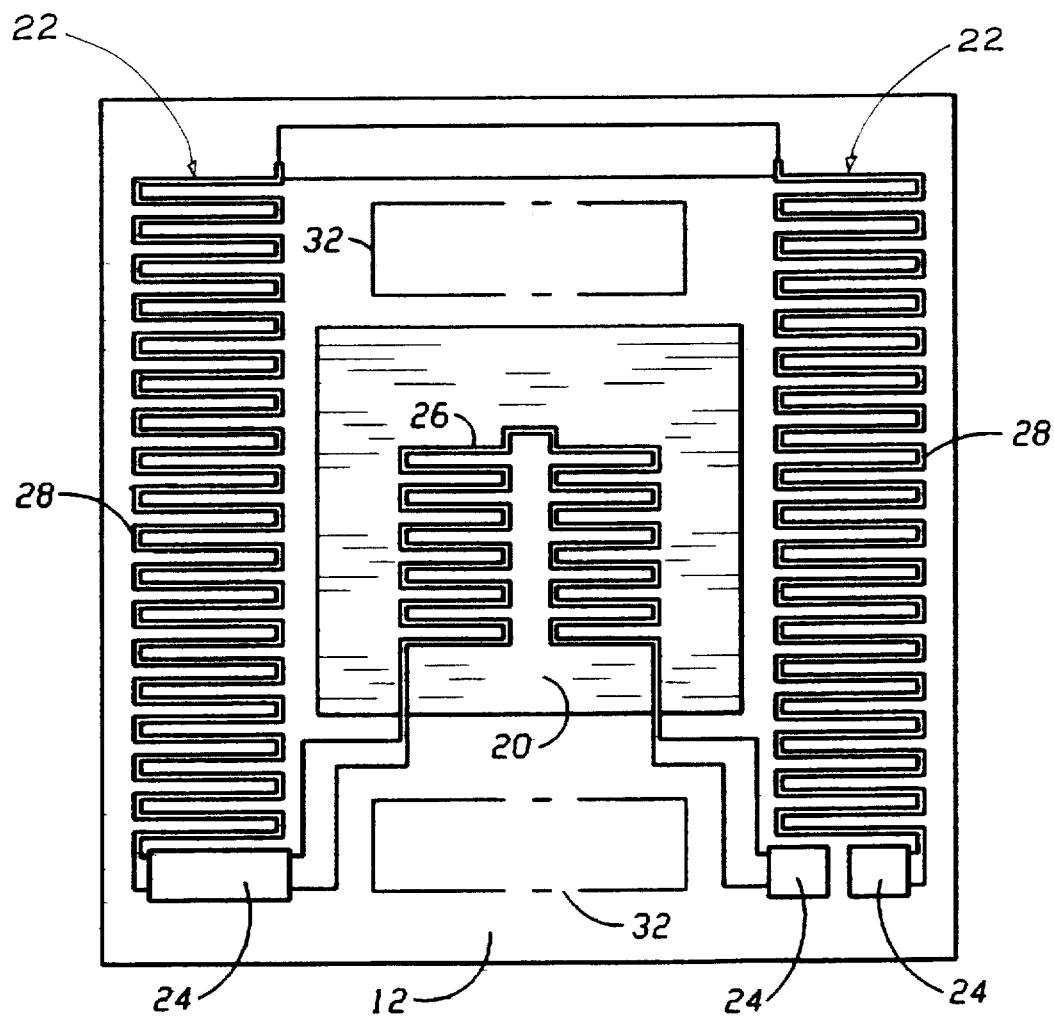
FIG. 4 is a plan view of the sensor structure of the present invention without the cover.

As shown in FIG. 4, a thin film resistance layer 22 is formed over membrane 20 and top surface 18 of substrate 12. Resistance layer 22 may be formed in a pattern as shown by, for example, a metallization process which includes a deposit of a chrome layer of approximately 30.0 nm thickness, covered by a nickel layer of approximately 200.0 nm thickness, covered by a gold layer on the area of wire bond electrical connection pads 24. The resistance layer 22 includes a central resistive sensor element 26 positioned on membrane 20, and an external ambient resistive element 28 positioned on top surface 18 of substrate 12 adjacent membrane 20. A final passivation layer of silicon nitride may be applied over the metallization layers to minimize unbalanced membrane stresses. Electrical connections to the sensor are made from electrical connection pads 24 to connection points (not shown) on the electrical header 17.

A silicon cover 30 is bonded at areas 32 upon top surface 18 of substrate 12 to completely cover membrane 20 and resistive sensor element 26 thereon. As shown in FIG. 1, an underside 34 of cover 30 is spaced a distance Δx from the top surface of membrane 20 to form a cavity 36 between a bottom surface of cover 30 positioned over the membrane and the top of membrane 20. The cross-sectional thickness dimension Δx of cavity 36, as measured from the underside 34 of cover 30 to membrane 20, may be accomplished by application of a material bonding layer 31 to the cover bonding areas 32 in a thickness equal to the desired Δx dimension. Upon attachment of cover 30 to the material/adhesive layer 31, the underside 34 of cover 30 is thereby spaced from membrane 20 by distance Δx which is preferably in a range of less than ten microns, and is more preferably in a range of five microns or less. It has been discovered by the inventors that the smaller the Δx dimension, the greater the sensitivity of the structure at pressures approaching atmosphere (760 Torr). This is because a very small Δx dimension prevents gas in cavity 36 from reaching the viscous flow regime wherein heat conduction is not proportional to pressure, and minimizes heat transfer by convection. A Δx dimension of five microns (+/−1 micron) is consistently producible in mass quantities and produces accurate pressure measurement throughout the approximate range of 760 Torr to $1 \times 10^{-5}$ Torr. The sensor of the present invention has also demonstrated sensitivity outside of these pressure range values. Material bonding layer 31 may be, for example, a metallization layer which includes layers of different bonding materials such as chrome and/or gold.

Figure 5:
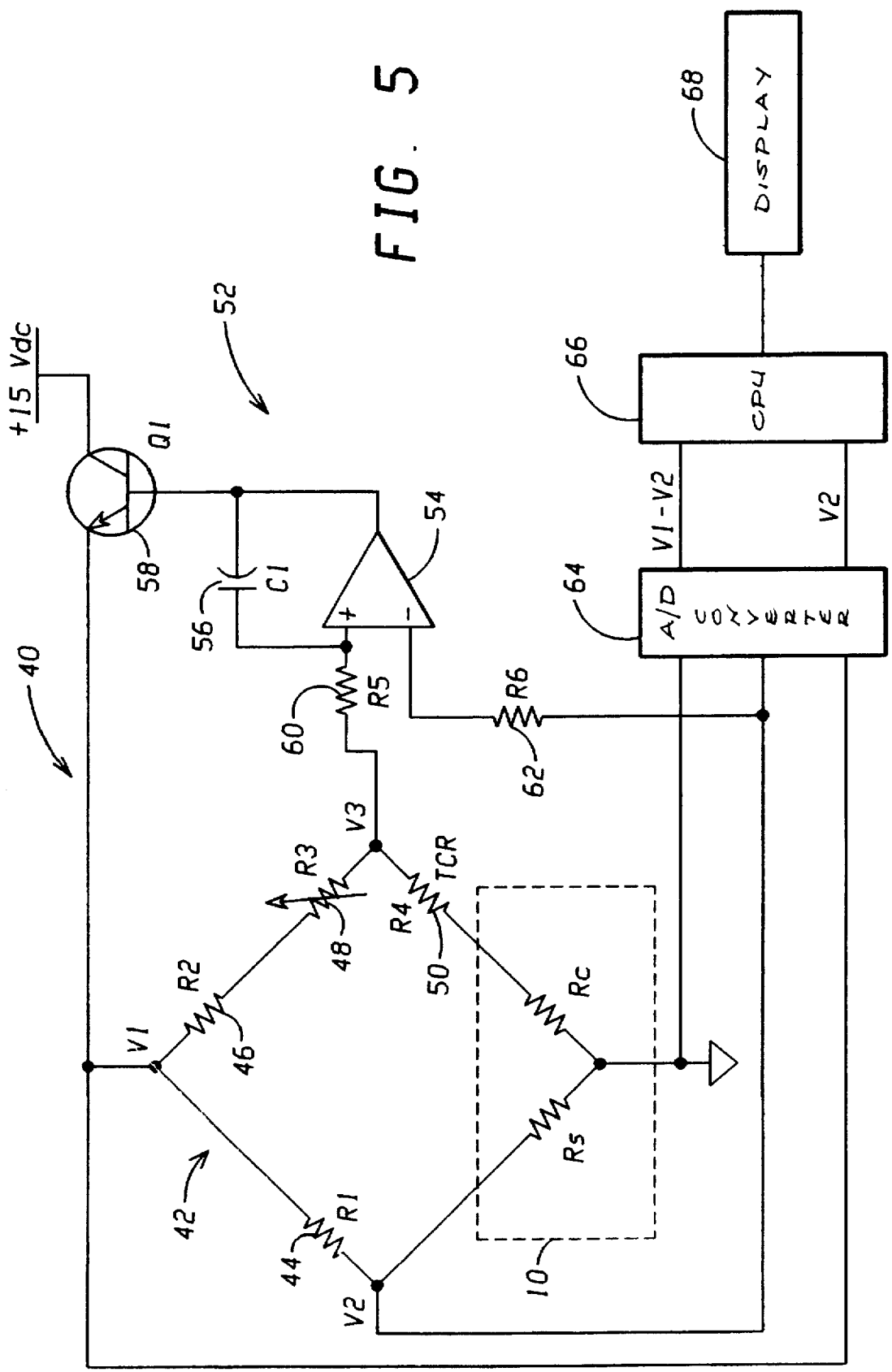
FIG. 5 is a schematic diagram of the sensor control and measurement circuitry of the present invention.

FIG. 5 schematically diagrams a sensing and control circuit 40 of sensor 10, wherein Rs represents resistive sensor element 26 on membrane 20 and Rc represents external ambient resistive element 28 on substrate 12 outside of and adjacent cover 30. Since both resistive elements Rs and Rc are created at the same time and out of the same material in common metallization layers, they have essentially equal temperature coefficient of resistance (TCR) values. The resistance of Rc is approximately three times greater than the resistance of Rs. By virtue of position of placement upon the sensor structure, element Rc has a silicon substrate beneath the silicon nitride, whereas element Rs has a large void in the form of chamber 14 beneath membrane 20. Since power is inversely proportional to resistance for a given voltage ($P=V^2/R$), element Rc will generate only one third of the power that element Rs does for the same applied voltage. Because element Rc is connected directly to the silicon substrate and subsequently to the header, heat generated by voltage applied to the sensor is quickly dissipated to the ambient atmosphere. For reasonable values of input voltage, the internal temperature of Rc will not change. This means that changes of input voltage applied to the sensor will not change the resistance of element Rc.

The sensor element Rs, however, has a large thermal resistance between it and the ambient temperature. When a voltage is applied across sensor element Rs, the sensor temperature and resistance will rise. This increased temperature results in a temperature differential ΔT between the sensor element Rs and the ambient element Rc during operation. Heat dissipation from the sensor is dependent on pressure. By monitoring the power necessary to maintain the ΔT at some constant value, a measure of the pressure can be obtained.

Elements Rs and Rc are put into a voltage dividing bridge circuit 42 which includes resistive elements Rs and Rc and resistive elements 44, 46, 48 and 50 referred to hereinafter as R1, R2, R3 and R4, respectively. Each side of the bridge acts as a voltage divider of V1. Voltages V2 and V3 are determined according to the equations:

$$V2 = \frac{Rs}{Rs+R1} \cdot V1 \qquad \text{Eq. 1}$$

$$V3 = \frac{Rc+R4}{Rc+R4+R2+R3} \cdot V1 \qquad \text{Eq. 2}$$

The bridge circuit 42 is powered and balanced by a closed loop control circuit, indicated generally at 52, which includes a FET input amplifier 54, an integrator capacitor 56 and a voltage-to-current conversion transistor 58. Based upon a voltage differential between sides of the bridge, control circuit 52 will increase V1 until V2 equals V3 to balance the bridge. As V1 rises the resistance value of Rs increases. This increase in the resistance of element Rs causes V2 to rise faster than V3 due to the power absorbed by resistive element Rs. At some power level, V2 will equal V3. The closed loop control circuit 52 will adjust the power level until it finds V2 =V3 equilibrium. The resistance of element R3 can be adjusted to set the power level at which both sides of the bridge are balanced. A FET input amplifier 54 is used in control circuit 52 for its extremely high input impedance to avoid errors in the bridge voltage balancing. Resistors 60 and 62 are provided to balance error current inputs to the amplifier. The resistive element relationships at V2 =V3 are:

$$\frac{Rc + R4}{Rc + R4 + R2 + R3} = \frac{Rs}{Rs + R1} \qquad \text{Eq. 3}$$

Resistive element R4 is necessary to compensate for the fact that the TCR of metals decreases slightly with increasing temperature.

In order to hold the temperature differential constant between element Rc and element Rs, both sides of the bridge circuit must rise by the same percentage when the temperature rises in order to keep the bridge balanced at the same value of power input.

The resistance value of resistive elements changes according to changes in ambient temperature by the relationship:

$$R' = R \cdot (1 + \alpha \cdot \delta T) \qquad \text{Eq. 4}$$

where R is the resistance at a first temperature, $\alpha$ is the temperature coefficient of resistance (TCR), $\delta T$ is the change in ambient temperature, and R' is the resistance at a second temperature. Accordingly, a corresponding change in voltage can be calculated by:

$$V3' = \frac{Rc' + R4}{Rc' + R4 + R2 + R3} \cdot V1 \qquad \text{Eq. 5}$$

Since V3 will increase with increasing ambient temperature, V1 will increase until V2 =V3 once again. The increase in the value of V2 increases the resistance of Rs according to the relationship:

$$V2' = \frac{Rs'}{Rs' + R1} \cdot V1' \qquad \text{Eq. 6}$$

setting V2'=V3' and dividing by V1', we have:

$$\frac{Rc' + R4}{Rc' + R4 + R2 + R3} = \frac{Rs'}{Rs' + R1} \quad \text{at balance} \qquad \text{Eq. 7}$$

$$\frac{(Rc + R4) \cdot (1 + \alpha 1 \cdot \delta T1)}{(Rc + R4) \cdot (1 + \alpha 1 \cdot \delta T1) + R2 + R3} = \frac{Rs \cdot (1 + \alpha \cdot \delta T)}{Rs \cdot (1 + \alpha \cdot \delta T) + R1} \qquad \text{Eq. 8}$$

Where $\delta T1$ is the ambient temperature increase, $\delta T$ is the temperature increase of the sensor (as a result of increase in the ambient temperature), $\alpha$ is the TCR of the sensor, and $\alpha 1$ is the TCR of Rc+R4.

If $\alpha = \alpha 1$ then:

$$\frac{(Rc + R4) \cdot (1 + \alpha 1 \cdot \delta T1)}{Rc + Rc \cdot \alpha \cdot \delta T1 + R4 + R4 \cdot \alpha \cdot \delta T1 + R2 + R3)} = \frac{Rs \cdot (1 + \alpha \cdot \delta T)}{Rs + Rs \cdot \alpha \cdot \delta T + R1} \qquad \text{Eq. 9}$$

$$\delta T = \frac{-Rc \cdot R1 - Rc \cdot \alpha \cdot \delta T1 \cdot R1 - R4 \cdot R1 - R4 \cdot \alpha \cdot \delta T1 \cdot R1 + Rs \cdot R2 + Rs \cdot R3}{-Rs \cdot \alpha \cdot R2 - Rs \cdot \alpha \cdot R3} \qquad \text{Eq. 10}$$

substituting Eq. 3 we get:

$$Rs = \frac{(Rc \cdot R1 + R4 \cdot R1)}{(R2 + R3)} \qquad \text{Eq. 11}$$

Therefore, the sensor temperature will increase precisely the same amount of ambient temperature increase to maintain the $\delta T$ above ambient temperature. This clearly demonstrates the successful design of the ambient temperature compensation.

Conduction of heat from the sensor for constant thermal conductivity can be expressed according to Fourier's law of heat conduction as:

$$dQ = k \cdot A \cdot \frac{\Delta T}{\Delta X} \qquad \text{Eq. 12}$$

where dQ is the heat transfer, k is the thermal conductivity, A is the heat transfer area, $\Delta T$ is the temperature differential and $\Delta x$ is the distance.

Analog signals of the voltage differential V1–V2 and voltage V1 are input to an analog-to-digital converter 64 which is preferably a $\Sigma$–$\Delta$ analog-to-digital converter, such as an AD7710 manufactured by Analog Devices of Norwood, Mass. If in a short period of time (e.g., <$\frac{1}{60}$ sec) a large number of measurements of the signal are gathered and averaged together, the mean value will reject most of the random thermal and electrical noise. A low pass filter in the converter followed by this averaging technique rejects the vast majority of system noise. The converter is used for both the voltage and current signals. This rejects most of the noise and gets the signals into a processor where the conversion to power values is done digitally to minimize error.

Digital values of the voltages are input to a microprocessor 66, such as a Motorola 68HC11, which is programmed to compute power values from the relationship (V1–V2)/R1×V2. At low pressures, where conduction is proportional to pressure, the power signals are multiplied by a constant to give corresponding pressure values. At higher pressures, for example above 10 Torr (the transition region), the power values are used as independent variables in a polynomial correction (based on a voltage versus pressure output curve) to give corresponding pressure values. Selected output of the microprocessor may be displayed or produced in any known manner such as by connection to an LED display 68.

The total heat transfer from the sensor can be expressed as the sum of the individual heat transfer paths. One heat transfer path is by heat conduction through the gas from the heated sensor (element Rs on membrane 20) through chamber 36 to the underside of cover 30. This is denoted as dQ0. The heat transfer area A is the total area of element Rs on the membrane. The value k is the conductivity of the gas between the membrane 20 and the underside 34 of cover 30. $\Delta T$ (e.g., 30° C.) is the difference in temperature between the membrane and the underside of cover 30. The distance $\Delta x$ is measured from the top surface of membrane 20 to the ceiling 34 of cavity 36 and, as mentioned, is on the order of 5 microns.

For a given geometrical configuration, A and $\Delta x$ are constant and can therefore be combined into one constant. If the temperature of the sensor is controlled such that the ΔT between the membrane and the underside of the cover is constant, then ΔT can also be combined with A and Δx and denoted as K0, where:

$$K0 = A \cdot \frac{\Delta T}{\Delta x} \qquad \text{Eq. 13}$$

Therefore, $$dQ0 = k \cdot K0 \qquad \text{Eq. 14}$$

where k varies according to gas composition and pressure.

The other main heat transfer path (dQ1) from the sensor is via conduction through the membrane 20 through substrate 12. Since this path is entirely through solid (silicon) materials which have constant thermal conductivities when a constant temperature differential is maintained, the thermal conduction (K1) of this part of the sensor is constant.

The other possible types of heat transfer from the sensor are by convection and radiation. The temperature of the sensor is kept within 30° C of the surroundings to minimize heat transfer by radiation. The small vertical dimension (5 microns) of chamber 36 over membrane 20 prevents heat transfer via this channel from reaching the viscous flow regime. Therefore, heat transfer by convection does not become appreciable. Total heat transfer from the sensor can therefore be represented as:

$$dQ = dQ0 + dQ1 = k \cdot K0 + K1 \qquad \text{Eq. 15}$$

Total heat transfer from the sensor must equal the power input to the sensor.

$$P = k \cdot K0 + K1 \qquad \text{Eq. 16}$$

where P equals input power. Since P=I·V, $$I = \frac{V1 - V2}{R1} \qquad \text{Eq. 17}$$

$$V = V2$$

then $$V2 \cdot \frac{V1 - V2}{R1} = k \cdot K0 + K1 \qquad \text{Eq. 18}$$

factoring out R1 as a constant we have:

$$V2 \cdot (V1 - V2) = k \cdot K0' + K1' \qquad \text{Eq. 19}$$

where $$K0'398 = K0 \cdot R1 \qquad \text{Eq. 20}$$

and $$K1' = K1 \cdot R1 \qquad \text{Eq. 21}$$

When all the gas is removed from the sensor, there can be no conduction from the membrane to the underside 34 of cover 30 in which case k equals zero. Therefore, at high vacuum (e.g., P<3×10¹⁰ Torr):

$$V2 \cdot (V1 - V2) = K1' \qquad \text{Eq. 22}$$

An auto zero button may be provided to signal the microcomputer when the system is below 10⁻⁶ Torr. K1 can then be measured and stored as a known value for a particular installation of the sensor. From this basis point, k can be determined as:

$$k = \frac{V2 \cdot (V1 - V2) + K1'}{K0'} \qquad \text{Eq. 23}$$

Since K0' is dependent only on the geometry of the chip and the differential temperature of the sensor, there is a high degree of uniformity among sensor installations in different systems. A span adjustment can be provided to correct for small errors from one system to another by adjusting a particular system to a standard value and a known pressure with a known gas, e.g., nitrogen at 760 Torr.

In the molecular flow regime, when the Knudsen number is more than one (Kn>1), heat conduction is directly proportional to system pressure. We find that when the system pressure is about 9 Torr the Knudsen number is equal to 1.0.

If the pressure about the sensor is less than about 9 Torr, the sensor is in the molecular flow regime. If the Knudsen number is less than 0.01 (Kn<0.01), the system is in viscous flow and conductivity is independent of pressure. When the Knudsen number is in the transition flow, the conductivity is still dependent on pressure but is a more complicated function of pressure. When the system pressure reaches approximately 900 Torr, the Knudsen number is 0.01. Thus, the sensor remains in the transition region up to approximately 900 Torr. The sensor cannot detect pressure changes above this value.

What is claimed is:

1. A gas pressure sensor for sensing gas pressures in the approximate range of 760 Torr to 1×10 Torr, the pressure sensor comprising;

a single piece base having a thickness dimension of at least 100 microns and having a cavity which extends from a bottom surface of the base to a top surface of the base, an opening in a side wall of the base to the cavity, a membrane on the top surface of the base dimensioned to cover the cavity, a first resistive element on the membrane, a second resistive element on the base, a cover over the membrane, the cover having a top surface and a bottom surface, the bottom surface of the cap attached to the top surface of the base and spaced from the membrane a distance less than 10 microns, a controlled voltage source for applying voltages to the first and second resistive elements, and a measuring circuit for measuring voltage applied to the first and second resistive elements, the voltage measurements being indicative of pressure about the sensor.

2. The pressure sensor of claim 1, wherein the base comprises a single piece of silicon.

3. The pressure sensor of claim 1, wherein internal side walls of the cavity are angled from the bottom surface of the base to the top surface of the base.

4. The pressure sensor of claim 1, wherein a thickness dimension of the base and cavity, measured from the bottom surface of base to the top surface of the base, is approximately four hundred microns.

5. The pressure sensor of claim 1, wherein a thickness dimension of the cap, measured from a top surface of the cap to a bottom surface of the cap, is approximately four hundred microns.

6. The pressure sensor of claim 1, wherein the bottom surface of the cover is parallel to the membrane and is spaced from the membrane a distance in a range of approximately ten microns or less.

7. The pressure sensor of claim 1, wherein the membrane is comprised of silicon nitride.

8. The pressure sensor of claim 1, wherein the first resistive element is comprised of a single continuous pattern of thin film material on the membrane.

9. The pressure sensor of claim 1, wherein the second resistive element is on the top surface of the base.

10. The pressure sensor of claim 1, wherein the membrane has an area in the approximate range of one to two square millimeters.

11. The pressure sensor of claim 1, wherein the membrane has a thickness dimension of approximately one micron.

12. The pressure sensor of claim 1, wherein the first resistive element has a nominal resistive value approximately 200 ohms.

13. The pressure sensor of claim 1, wherein the first resistive element and the second resistive element are formed from a common metallization layer.

14. The pressure sensor of claim 1, wherein the first and second resistive elements are comprised of nickel.

15. The pressure sensor of claim 1, further comprising a passivation layer of silicon nitride over the first resistive element on the membrane and the second resistive element on the base.

16. The pressure sensor of claim 1, wherein the resistance value of the second resistive element is on the order of three to four or more times greater than the resistive value of the first resistive element.

17. The pressure sensor of claim 1, further comprising electrical leads to the first and second resistive elements, the electrical leads mounted on an area of the base adjacent the membrane.

18. The pressure sensor of claim 17, wherein one leg of the first resistive element is connected with one leg of the second resistive element by common connection to one of the electrical leads.

19. The pressure sensor of claim 1, wherein the first resistive element and the second resistive element have approximately equal values of temperature coefficient of resistance.

20. A pressure sensing device for sensing atmospheric pressures, the pressure sensing device comprising, a silicon chip substrate having a gas chamber formed therein, the gas chamber extending through a cross-section of the chip substrate from a bottom surface of the chip substrate to a top surface of the chip substrate, a top opening of the gas chamber covered by a membrane on a top surface of the chip, an opening in a side wall of the chip into the gas chamber, a first resistive element mounted on the membrane, a second resistive element mounted on the chip and not over the gas chamber, a cover attached to the chip and covering the membrane and first resistive element, an underside of the cover spaced from the membrane a distance not greater than 10 microns, electrical leads connected to the first and second resistive elements, a voltage source connected to a bridge containing the first and second resistive elements, and a microprocessor for receiving digitally converted analog values of voltages of the bridge applied to the first and second resistive element and for computing power values based upon voltage outputs of the bridge indicative of power required to maintain a predetermined temperature differential between the surface upon which the first resistive element is mounted and the surface upon which the second resistive element is mounted.

21. The pressure sensing device of claim 20, wherein the chip is approximately 2 millimeters square and has a total thickness dimension of approximately 800 microns, and wherein the gas chamber has a thickness dimension of approximately 400 microns.

22. The pressure sensing device of claim 20, wherein the membrane has a surface area of approximately one millimeter square.

23. The pressure sensing device of claim 20 wherein the cover is approximately 400 microns thick.

24. The pressure sensing device of claim 20, wherein the underside of the cover is spaced from the membrane by a depth dimension $\Delta x$ in the range of approximately five to ten microns.

25. The pressure sensing device of claim 20, wherein an electrical lead connected to the first resistive element is also connected to the second resistive element.

26. The pressure sensing device of claim 20, further comprising an analog-to-digital converter operative to convert mean analog values of voltage and current applied to the first and second resistive elements to digital values.

27. The pressure sensing device of claim 26, wherein the analog-to-digital converter is a $\Sigma$–$\Delta$ analog-to-digital converter.

28. The pressure sensing device of claim 20, wherein the resistance of the second resistive element is greater than the resistance of the first resistive element.

29. The pressure sensing device of claim 20, wherein the voltage applied to the bridge circuit is controlled by a closed loop control circuit operative to balance voltages on sides of the bridge circuit.

30. The pressure sensing device of claim 24, wherein the closed loop control circuit comprises a field effect transistor input amplifier.

31. The pressure sensing device of claim 20, wherein the bridge circuit further comprises at least one adjustable resistive element in addition to the first and second resistive elements.

32. The pressure sensing device of claim 20, wherein the bridge circuit further comprises at least one resistive element in addition to the first and second resistive elements operative to compensate for thermally induced changes in the temperature coefficients of resistance of the first and second resistive elements.

33. A method of measuring vacuum pressures of a known gas in the approximate pressure range of 760 Torr to $1 \times 10^{-5}$ Torr, comprising the steps of:

providing a gas pressure sensor having a silicon chip substrate with a gas chamber which extends through a cross-section of the chip substrate from a top of the chip substrate to a bottom of the chip substrate, a top opening of the gas chamber covered by a membrane attached to a top surface of the chip substrate, a first resistive element mounted on the membrane, a second resistive element mounted on the chip substrate and not over the gas chamber, an opening through a side wall of the chip substrate to the gas chamber, and a cover attached to the chip substrate and covering the membrane and first resistive element, an underside of the cover spaced from the membrane a distance not greater than 10 microns, applying a voltage to the first resistive element, applying a voltage to the second resistive element, controlling the applied voltages to maintain a temperature differential between the membrane and the chip substrate, and measuring the voltages and currents applied to the first and second resistive elements required to maintain the temperature differential, the measurements being indicative of pressure about the membrane.

34. The method of claim 33, further comprising the step of supplying voltages to the first and second resistive elements through a voltage dividing bridge circuit.

35. The method of claim 34, further comprising the step of controlling the voltages applied to the first and second resistive elements with a closed loop controller operative to balance the voltages on sides of the bridge circuit.

36. The method of claim 33, wherein the step of measuring voltages and currents applied to the first and second resistive elements is performed by converting a mean value of a plurality of voltage and current signals to digital signals and inputting the digital signals to a microprocessor to compute power values applied to the first and second resistive elements.

37. A gas pressure sensing structure for sensing vacuum pressures, the pressure sensing structure comprising:

a base having a gas chamber cavity which extends from a top of the base to a bottom of the base, a membrane covering a top opening to the gas chamber cavity, a cover attached to the base and covering the membrane, a bottom surface of the cover spaced from a top surface of the membrane a distance not grater than 10 microns, and a first resistive element disposed at least partially on the membrane, a second resistive element disposed at least partially on the base, a voltage source connected to the first and second resistive elements, and a measuring circuit for measuring voltages and currents applied to the first and second resistive elements, the measuring circuit comprising a bridge circuit having four resistors, the bridge circuit connected to an amplifier, a capacitor and a transistor.

* * * * *

UNITED STATES PATENT AND TRADEMARK OFFICE
CERTIFICATE OF CORRECTION

PATENT NO. : 5,557,972
DATED : Sept. 24, 1996
INVENTOR(S) : Jacobs, et al.

It is certified that error appears in the above-indentified patent and that said Letters Patent is hereby corrected as shown below:

col. 10, line 45, "Tort" should be --Torr-- col. 12, line 5, "grater" should be --greater--.

Signed and Sealed this

Tenth Day of December, 1996

Attest:

BRUCE LEHMAN

*Attesting Officer*    *Commissioner of Patents and Trademarks*